US012657342B2

(12) United States Patent
Lin

(10) Patent No.: US 12,657,342 B2
(45) Date of Patent: Jun. 16, 2026

(54) APPLYING TRANSFORMATIONS ON STREAMING OUTPUT

(71) Applicant: Salesforce, Inc., San Francisco, CA (US)

(72) Inventor: Chaney Lin, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 83 days.

(21) Appl. No.: 18/790,536

(22) Filed: Jul. 31, 2024

(65) Prior Publication Data

US 2026/0037668 A1 Feb. 5, 2026

(51) Int. Cl.
*G06F 21/62* (2013.01)
*H04L 67/306* (2022.01)

(52) U.S. Cl.
CPC ........ *G06F 21/6254* (2013.01); *H04L 67/306* (2013.01)

(58) Field of Classification Search
CPC ............................ G06F 21/6254; H04L 67/306
See application file for complete search history.

(56) References Cited

U.S. PATENT DOCUMENTS

| | | | | | |
|---|---|---|---|---|---|
| 11,057,464 | B1 * | 7/2021 | Wei | ........................ | G06F 3/0656 |
| 11,816,227 | B2 * | 11/2023 | Stockwell | ........... | G06F 12/1491 |
| 11,943,340 | B2 * | 3/2024 | Cui | ........................ | G06F 21/78 |
| 2019/0171187 | A1 * | 6/2019 | Cella | ...................... | G06N 3/006 |
| 2020/0272770 | A1 * | 8/2020 | Koyuncu | ........... | G06F 12/1441 |
| 2020/0364379 | A1 * | 11/2020 | Vijayasankar | ...... | H04L 67/1097 |
| 2021/0064435 | A1 * | 3/2021 | Brewer | ................. | G06F 9/5016 |
| 2022/0067500 | A1 * | 3/2022 | Choque | ................... | G06N 3/08 |
| 2022/0215111 | A1 * | 7/2022 | Ekins | .................. | G06F 21/6218 |
| 2023/0137436 | A1 * | 5/2023 | Chen | ...................... | G06F 21/57 726/26 |
| 2024/0378424 | A1 * | 11/2024 | Bodigutla | ................ | G06N 3/08 |
| 2025/0233826 | A1 * | 7/2025 | Liu | ................... | H04W 28/0278 |

OTHER PUBLICATIONS

Papernot et al., "SoK: Security and Privacy in Machine Learning, " 2018 IEEE European Symposium on Security and Privacy (EuroS &P), London, UK, pp. 399-414 (Year: 2018).*

* cited by examiner

*Primary Examiner* — Morshed Mehedi
(74) *Attorney, Agent, or Firm* — Lee & Hayes, P.C.

(57) ABSTRACT

Techniques for streaming generative machine learned model (or LLM) output to a virtual space are described herein. A system may receive a request to perform an action. The system may leverage LLMs to assist in performing aspects of the requested action. The system can generate input data to input into the LLM. When generating the input data, the system can identify sensitive data associated with the request. The system can modify the input data to mask and/or anonymize the sensitive data. The system can input the input data into an LLM trained to output a subset (e.g., less than all) of the response at a time. The system can add the output subset to a buffer and upon identifying the masked data in the buffer, the system can demask the sensitive data and output the sensitive data to the user profile in a streaming manner.

20 Claims, 5 Drawing Sheets

300

400

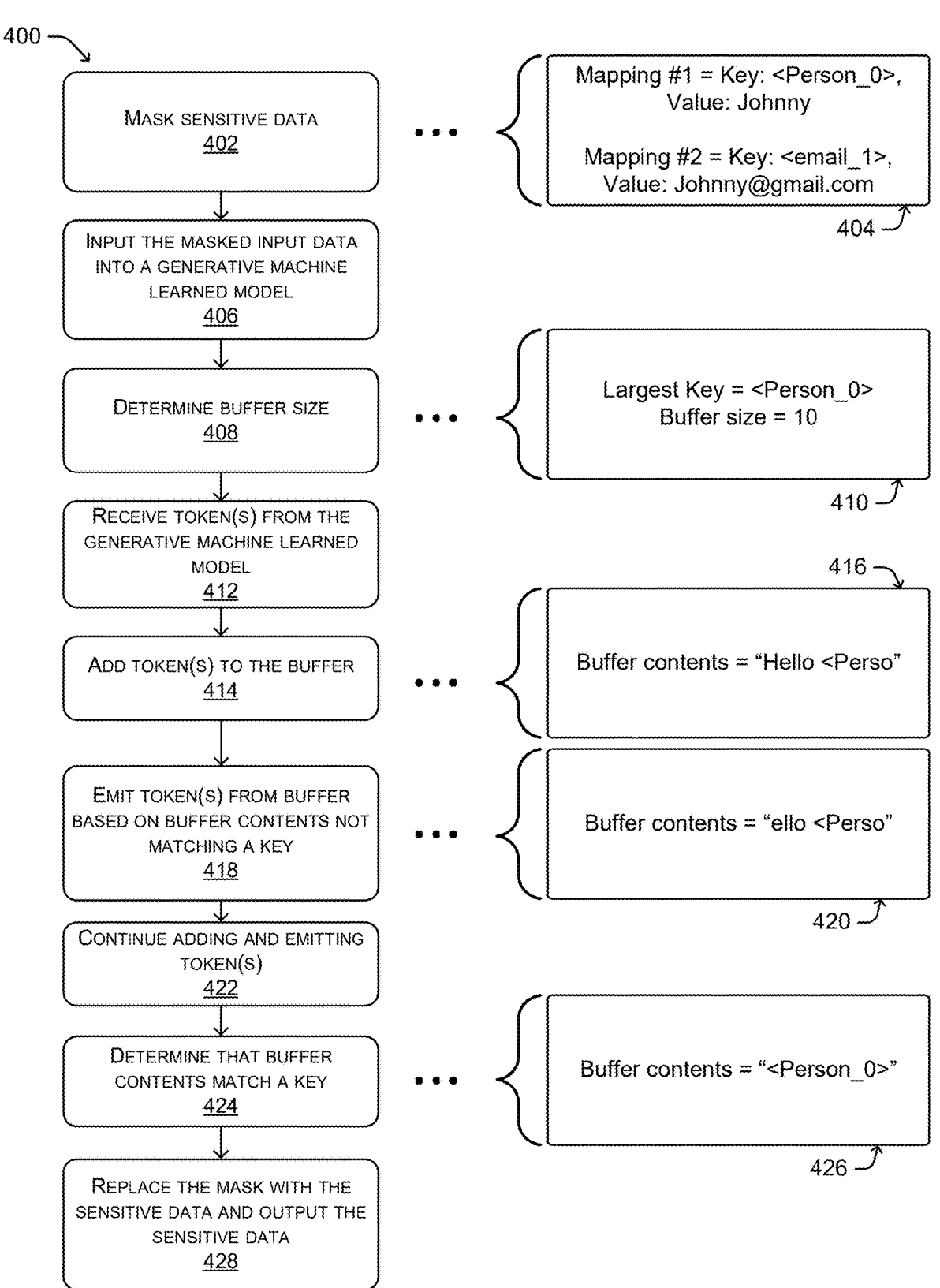

MASK SENSITIVE DATA
402

• • •

Mapping #1 = Key: <Person_0>,
Value: Johnny

Mapping #2 = Key: <email_1>,
Value: Johnny@gmail.com

404

INPUT THE MASKED INPUT DATA
INTO A GENERATIVE MACHINE
LEARNED MODEL
406

DETERMINE BUFFER SIZE
408

• • •

Largest Key = <Person_0>
Buffer size = 10

410

RECEIVE TOKEN(S) FROM THE
GENERATIVE MACHINE LEARNED
MODEL
412

416

ADD TOKEN(S) TO THE BUFFER
414

• • •

Buffer contents = "Hello <Perso"

EMIT TOKEN(S) FROM BUFFER
BASED ON BUFFER CONTENTS NOT
MATCHING A KEY
418

• • •

Buffer contents = "ello <Perso"

420

CONTINUE ADDING AND EMITTING
TOKEN(S)
422

DETERMINE THAT BUFFER
CONTENTS MATCH A KEY
424

• • •

Buffer contents = "<Person_0>"

426

REPLACE THE MASK WITH THE
SENSITIVE DATA AND OUTPUT THE
SENSITIVE DATA
428

FIG. 4

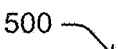
500

RECEIVE A REQUEST FOR A GENERATIVE MACHINE LEARNED MODEL TO
PERFORM AN ACTION
502

IDENTIFY, PRIOR TO INPUTTING DATA ASSOCIATED WITH THE REQUEST INTO
THE GENERATIVE MACHINE LEARNED MODEL, SENSITIVE DATA
504

GENERATE, IN RESPONSE TO IDENTIFYING THE SENSITIVE DATA, MODIFIED
DATA THAT INCLUDES A MASK TO ANONYMIZE THE SENSITIVE DATA
506

INPUT THE MODIFIED DATA INTO THE GENERATIVE MACHINE LEARNED MODEL
THAT IS CONFIGURED TO OUTPUT A RESPONSE
508

RECEIVE, FROM THE GENERATIVE MACHINE LEARNED MODEL, A SUBSET OF
THE RESPONSE
510

CAUSE THE SUBSET OF THE RESPONSE TO BE ADDED TO A BUFFER
512

DOES BUFFER
INCLUDE THE MASK?
514

No

YES

OUTPUT A TOKEN FROM THE
BUFFER
516

DEMASK THE CONTENT OF THE
BUFFER
518

OUTPUT THE DEMASKED
CONTENT
520

FIG. 5

APPLYING TRANSFORMATIONS ON STREAMING OUTPUT

TECHNICAL FIELD

Users may use one or more systems and/or platforms to perform various tasks. In some cases, the users may input information to the system and request that the system perform an operation based on such information. However, when requesting that the systems and/or platforms perform an operation based on the information, the operations may result in an undesirable user experience.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

FIG. 4 is a pictorial flow diagram illustrating an example technique for masking sensitive data and/or applying transformations on streaming output.

FIG. 5 is a flow diagram illustrating an example process for receiving a request for a generative machine learned model to perform an action, generating data to input to the generative machine learned model, and outputting a streamed response to a virtual space and/or user device.

DETAILED DESCRIPTION

Figure 1:
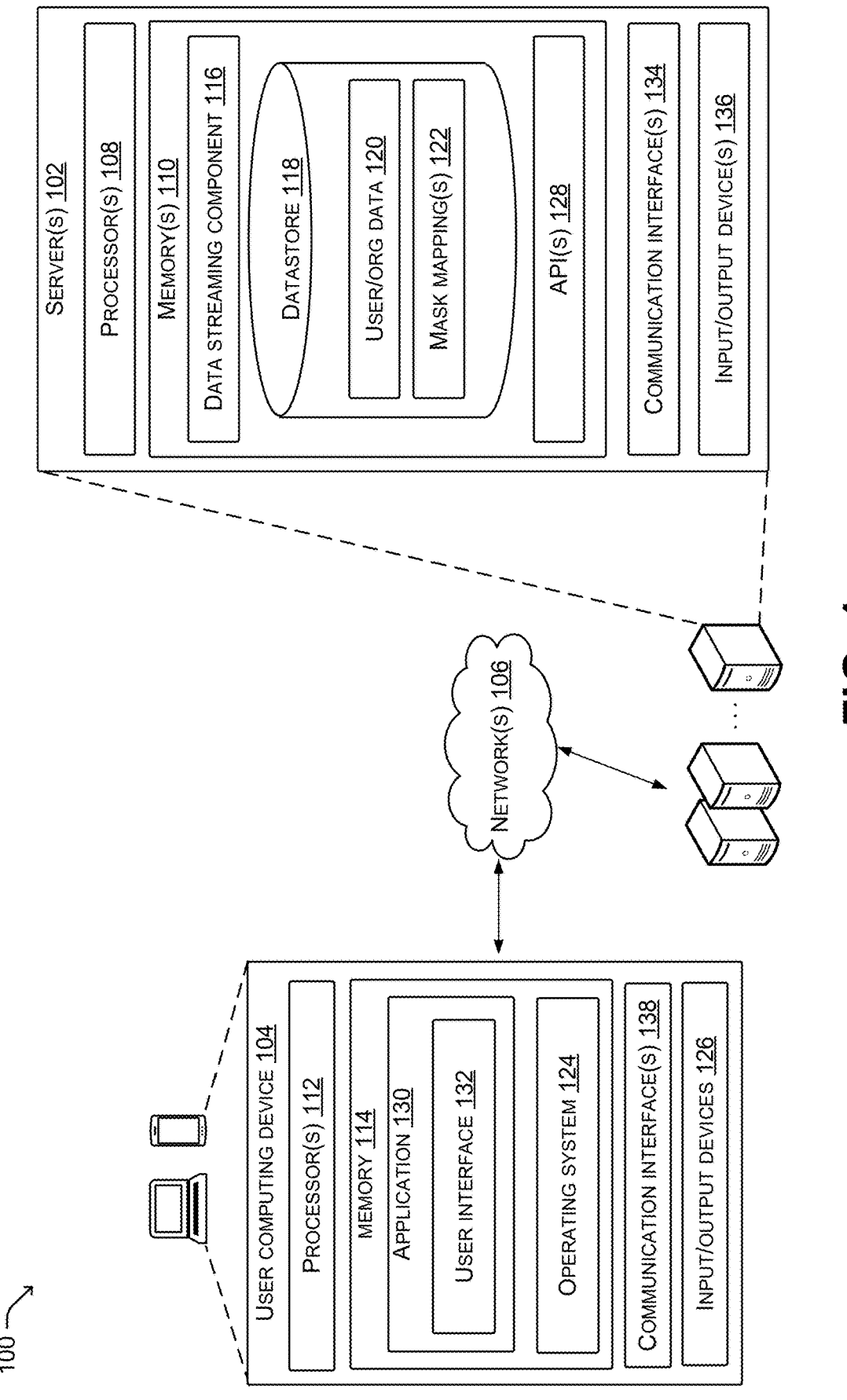
FIG. 1 illustrates an example system for performing techniques described herein.

Techniques for streaming generative machine learned model output to a virtual space are described herein. As described throughout, systems can mask and demask data to be streamed to a user. In some examples, a system may receive a request to perform an action. The system may leverage one or more generative machine learned models (hereinafter referred to as an "LLM") to assist in performing one or more aspects of the requested action. Accordingly, the system can generate data (e.g., input data) to input into the LLM. When generating the input data, the system can identify sensitive data (e.g., name(s) (e.g., usernames, organization names, etc.), addresses, financial information, etc. within the request. The system can modify the input data to mask and/or anonymize the sensitive data. In such cases, the system can input the input data into an LLM trained to output a subset (e.g., less than all) of the response at a time. The system can add the output subset to a buffer and upon identifying the masked data in the buffer, the system can demask the sensitive data and output the sensitive data to the user profile in a streaming manner. As discussed throughout this disclosure, the techniques may improve the user experience by decreasing the perceived latency of LLM output while maintaining the security of sensitive data associated with the requesting user.

When using an LLM to interface with users, it may be beneficial to decrease latency when outputting content to such users. For example, when interacting with an LLM or a system that uses an LLM, the perceived latency from the time the user profile enters the input to the system to the time the LLM outputs the response may be an extended period of time and as such, may negatively impact the user experience. In these cases, existing systems may use a non-streaming output technique. Non-streaming may be when the LLM receives the input from the user profile and outputs an entire (or complete) block of text (or other content) in return. In the case of non-streaming, the user may perceive a higher level of latency since the LLM waits until the entire response is available to output prior to outputting to the user profile. Accordingly, the techniques and systems described herein may include reducing the perceived latency problem by introducing a streaming technique. Streaming may be when the LLM receives the input from the user profile and outputs one toke or a group of tokens (or characters) at a time. That is, instead of waiting for a complete response to output to the user profile, the system may stream the content to the user profile which may get the user engagement started by outputting partial responses in batches as such responses become available. In the case of streaming, the user may perceive a lower level of latency since the response is quickly being output.

To address these and other technical problems and inefficiencies, the systems and/or techniques described herein may include a data streaming component (which also may be referred to as a "data streaming system") configured to stream output from an LLM to a user profile. The technical solutions discussed herein solve one or more technical problems associated with high perceived latency of LLM output.

In some examples, a system may receive a request for an LLM to perform an action. That is, a user profile may submit a request to the system for the system to perform an action. The user profile may submit the request by verbally commanding (e.g., speaking-audio data) the system to perform an action, interacting with a user device that uses the system (e.g., clicking or touching a user interface object within the system, typing and/or submitting text to a text entry box within the system, etc.), etc. In some examples, the request may include an instruction for the system (or LLM) to perform an action. The actions may include summarizing data, synthesizing data, generating documents, responding to question(s) and/or prompt(s), receiving data, etc.

In some examples, the system may generate input data to input into the LLM based on the request. That is, the system may retrieve data to input into the LLM and use such data as the input data. The system may generate the input data by retrieving data from one or more sources. Such sources may include one or more databases within or otherwise associated with the system, information associated with the request (e.g., the question or command included in the request), etc. As such, the system may incorporate data from various sources when generating the input data.

In some examples, the system may identify sensitive data within the input data. That is, prior to inputting the input data into the LLM, the system can identify sensitive data included in the input data. Sensitive data may include name(s) (e.g., username(s), organization name(s), etc.), phone number(s), addresses, government issued document(s) and/or information (e.g., driver's license data, social security number, passport data, etc.), financial data (e.g., credit card data, debit card data, bank account data, etc.), and/or any other type of data. In other cases, sensitive data may include any type of data (e.g., arbitrary) as designated by a user or organization. In some cases, information in the input data (which may be based on data in the request and/or the database associated with the system) may be sensitive data and as such, the users may not want the LLM using the sensitive data to train on and/or may want to keep such data secure. As such, the system may identify and/or anonymize the sensitive data in the input data. The system may identify sensitive data using one or more machine learned models, heuristics, and/or rules.

In some examples, the system may mask the sensitive data such that the sensitive data is not input to the LLM. That is, the system can modify the input data (e.g., generate modified input data) that includes a mask to anonymize the sensitive data. A mask may be an obfuscation of data such that the LLM does not have access to (or information about) the sensitive data. Further, the mask may be a placeholder that is consistently used for a specific type of instance of the sensitive data. The mask may be any type of data such as "<person_0>," "email_1," etc. When masking the sensitive data, the system may maintain a mapping that includes a key-value pair. The key may be the masked data and the value may be the sensitive data. For example, the name "John" may be identified as sensitive data and the mask for such data may be "<Person_1>." As such, the key-value pair mapping may be "<Person_1>" as the key and "John" as the value. However, this is not intended to be limiting; in other examples, the sensitive data may be key and the mask may be the value. In some examples, the system may store or otherwise maintain the mappings such that the system can use the mappings to demask the sensitive data prior to outputting the LLM response to the user.

In some examples, the system may input the modified input data into the LLM. That is, after masking the sensitive data, the system may input the modified input data into the LLM. As noted above, the modified input data may include non-masked data (e.g., non-sensitive data) and/or masked data (e.g., corresponding to sensitive data). The system may include one or more generative machine learned models (e.g., LLMs) that may be trained to perform various system operations. In some cases, the system may train the LLMs to perform specific tasks. Accordingly, the system may input the input data into the LLM.

In some examples, the system may receive a subset (e.g., less than all) of an entire response from the LLM. The LLM may be trained to output the response in a streaming manner. That is, the LLM may output one token (e.g., unit of data (e.g., letter, number, etc.)) or a group of tokens (e.g., two or more characters-less than the entire response) at a time. Based on receiving the token(s), the system may perform one or more operations on the token(s) and output (or stream) the output to the user profile. That is, the system can output tokens to the user profile prior to the entire LLM response being generated.

In some examples, prior to outputting the token(s) (or subset of the response) to the user profile, the system may determine whether to demask the token (e.g., whether the token corresponds to sensitive data). Upon receiving the token(s) from the LLM, the system may input the token(s) into a buffer (or queue). The buffer may be a first-in-first-out buffer. The size of the buffer may be based on (or correspond to) the longest key (or mask). That is, if the longest key is "<Person_1>", the system may determine that the size of the buffer is 10. In some examples, the system can add each token received from the LLM into the buffer. When the buffer is full (e.g., the system added N tokens where N is the size of the buffer), the system can determine if the content in the buffer matches (or is the same) as any of the keys in the mappings. If the content of the buffer matches a key, the system can replace the content in the buffer (e.g., the mask) with the sensitive data and output the sensitive data to the user profile. In contrast, if the content of the buffer does not match a key, the system can emit (or output) a token (e.g., the token that has been in the buffer the longest) to the user profile and/or add the newly received token from the LLM into the buffer. The system may perform such operations while the LLM continuously outputs tokens (or subsets) of the response.

In some examples, the system can output the modified subset (e.g., unmasked data) to the first user. As noted above, the system can output the sensitive data or the token emitted from the buffer. In such cases, the system can cause the data to be output to a user device and/or a virtual space accessible to the requesting user. That is, the system can display the sensitive data or the token to the user in a streaming manner such that the perceived latency of the system is low and that that the user has a positive experience with the system providing fast responses.

As illustrated by these examples, the techniques described herein can improve the functioning, efficiency, and overall user experience of the communication platform. That is, the techniques described herein may enable the system to reduce the perceived latency of systems that leverage LLMs. Further, the techniques may enable the system to use an LLM without inputting sensitive data therein. Further, the techniques may result in an increased and/or an enhanced user experience.

The following detailed description of examples references the accompanying drawings that illustrate specific examples in which the techniques can be practiced. The examples are intended to describe aspects of the systems and methods in sufficient detail to enable those skilled in the art to practice the techniques discussed herein. Other examples can be utilized and changes can be made without departing from the scope of the disclosure. The following detailed description is, therefore, not to be taken in a limiting sense. The scope of the disclosure is defined only by the appended claims, along with the full scope of equivalents to which such claims are entitled.

FIG. 1 illustrates an example environment 100 for performing the techniques described herein. The techniques discussed herein may be used in a variety of environments and for a variety of uses, although the examples given herein discuss a customer service environment as one of these use cases since it's a use case familiar to many. In additional or alternate examples, the computing environment may comprise computing devices used for sales-based systems, communication platforms, chat engines, cybersecurity, search engines, multi-agent/agentic machine-learned model pipeline(s) and/or cluster(s), machine-learned model training, cloud/distributed computing or massive computing efficient data storage and/or retrieval, and/or the like.

In at least one example, the example environment 100 can include one or more computing devices, such as server(s) 102 and/or a user computing device(s) 104. By way of example and not limitation, the server(s) 102 may be representative of servers for hosting the software, hardware, containers, and/or the like to implement at least part of the techniques discussed herein. For example, the server(s) 102 may host (e.g., store and/or execute) system software. The user computing device(s) 104 may be representative of user computing device(s) associated with a first user (i.e., a first "client device").

The server(s) 102 may comprise one or more individual servers or other computing devices that may be physically located in a single central location or may be distributed at multiple different locations. The server(s) 102 communication may be hosted privately by an entity administering all or part of the environment 100 (e.g., a utility company, a governmental body, distributor, a retailer, manufacturer, etc.), or may be hosted in a cloud environment, or a combination of privately hosted and cloud hosted services. In some examples, the functional components and/or data discussed herein can be implemented on a single server, a cluster of servers, a server farm or data center, a cloud-hosted computing service, a cloud-hosted storage service, and so forth, although other computer architectures can additionally or alternatively be used. Moreover, the server(s) 102 may comprise hardware and/or software containers accessible to different tenants with access to the server(s) 102.

The user computing device(s) 104 may be any suitable type of computing device, e.g., portable, semi-portable, semi-stationary, or stationary. Some examples of the user computing device(s) 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. In some examples, the user computing device(s) 104 may comprise distributed computing devices, server(s), etc.

In some examples, the server(s) 102 and/or user computing device(s) 104 may be configured to transmit network packages therebetween via network(s) 106. The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, cellular network, or any other such network, or any combination thereof. The network(s) 106 may comprise a single network or collection of networks, such as the Internet, a corporate intranet, a virtual private network (VPN), a local area network (LAN), personal area network (PAN), metropolitan area network (MAN), a wireless local area network (WLAN), a cellular network, a wide area network (WAN), a metropolitan area network (MAN), or a combination of two or more such networks, over which the user computing device(s) 104 may transmit a request to and/receive an output from the server(s) 102 via the communication platform. Components used for such communications can depend at least in part upon the type of network, the environment selected, or both. Further, the network(s) 106 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON objects sent via a Websocket channel. In some embodiments, the protocol is JSON over RPC, JSON over REST/HTTP, and the like.

The server(s) 102 and the user computing device(s) 104 described herein may include one or more processors and/or memory. Specifically, in the illustrated example, server(s) 102 may include processor(s) 108 and memory 110 and user computing device(s) 104 include processor(s) 112 and memory 114.

By way of example and not limitation, the processor(s) 108 and/or 112 may comprise one or more central processing units (CPUs), graphics processing units (GPUs), tensor processing units (TPUs), field-programmable gate arrays (FPGAs), and/or process-acceleration devices such as application-specific integrated circuits (ASICs) or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions. For example, the processor(s) 108 and/or 112 can be one or more hardware processors and/or logic circuits of any suitable type specifically programmed or configured to execute the algorithms and processes described herein. The processor(s) 108 and/or 112 can be configured to fetch and execute computer-readable instructions stored in the computer-readable media, which can program the processor(s) to perform the functions described herein.

The memory 110 and/or 114 may comprise one or more non-transitory computer-readable media and may store software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/flash-type memory, RAM, ROM, EEPROM, flash memory, optical storage, solid state storage, magnetic tape, magnetic disk storage, RAID storage systems, storage arrays, network attached storage, storage area networks, cloud storage, or any other medium for storing information. The architectures, systems, and individual elements described herein may include many other logical, programmatic, and physical components, of which those shown in the accompanying figures are merely examples that are related to the discussion herein. The memory 110 and/or 114 can be used to store any number of software/functional components that are executable by the processor(s) 108 and/or 112, respectively. In many implementations, these functional components comprise instructions or programs that are executable by the processor(s) 108 and/or 112 and that, when executed, specifically configure the processor(s) 108 and/or 112 to perform the actions server(s) 102 and/or user computing device(s) 104, according to the discussion herein.

For example, server(s) 102 may comprise a memory 110 storing the data streaming component 116. As described throughout, the data streaming component 116 can mask and demask data to be streamed to a user. In some examples, a data streaming component 116 may receive a request to perform an action. The data streaming component 116 may leverage one or more LLMs to assist in performing one or more aspects of the requested action. Accordingly, the data streaming component 116 can generate data (e.g., input data) to input into the LLM. When generating the input data, the data streaming component 116 can identify sensitive data (e.g., name(s) (e.g., usernames, organization names, etc.), addresses, financial information, etc. within the request. The data streaming component 116 can modify the request data (e.g., input data) to mask and/or anonymize the sensitive data. In such cases, the data streaming component 116 can input the input data into an LLM trained to output a subset (e.g., less than all) of the response at a time. The data streaming component 116 can add the output subset to a buffer and upon identifying the masked data in the buffer, the data streaming component 116 can demask the sensitive data and output the sensitive data to the user profile in a streaming manner.

The memory 110 may additionally or alternatively comprise a portion of memory 110 (e.g., one or more memories or a portion of a single memory) that collectively forms a datastore 118 (e.g., a database). In some examples, the datastore 118 can be integrated with the server(s) 102, as shown in FIG. 1. In other examples, the datastore 118 can be located remotely from the server(s) 102 and can be accessible to the server(s) 102 and/or user device(s), such as the user computing device(s) 104. The datastore 118 can comprise multiple databases, which can include user/org data 120 and/or mask mapping(s) 122. Additional or alternative data may be stored in the data store and/or one or more other data stores.

In at least one example, the user/org data 120 can include permission data associated with permissions of individual users of the system or environment (e.g., sales-based platform, chat engine, search engine, etc.). In some examples, permissions can be set automatically or by an administrator of the platform, an employer, enterprise, organization, or other entity that utilizes the platform, a team leader, a group leader, or other entity that utilizes the platform for communicating with team members, group members, or the like, an individual user, or the like. Permissions associated with an individual user can be mapped to, or otherwise associated with, an account or profile within the user/org data 120. In some examples, such users can be defined by common access credentials, group identifiers, or the like, as described above.

In at least one example, the user/org data 120 can include data associated with one or more organizations of the platform. In at least one example, the user/org data 120 can store data in organization profiles, which can store data associated with an organization (or company), including, but not limited to, one or more user identifiers associated with the organization, one or more virtual space identifiers associated with the organization (e.g., workspace identifiers, communication channel identifiers, direct message instance identifiers, collaborative document identifiers, canvas identifiers, audio/video conversation identifiers, etc.), an organization identifier associated with the organization, one or more organization identifiers associated with other organizations that are authorized for communication with the organization, and the like.

In some examples, the mask mapping(s) 122 may comprise key-value pairs that correspond to anonymized sensitive data. That is, when the data streaming component 116 identifies sensitive data, the data streaming component 116 may generate a mask to obfuscate the sensitive data such that the sensitive data is not input into the LLMs. In this example, the data streaming component 116 may generate a mapping that includes a key (e.g., the mask) and a value (e.g., the sensitive data). Based on generating the mask mapping(s) 122, the system can store such mappings in the datastore 118. One or more demasking components can access the mask mapping(s) 122 to assist in demasking LLM output(s).

It will be appreciated that the terms "datastore," "database," "repository," and "network database" may be used interchangeably in areas of the present disclosure. As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like. Moreover, data may be transmitted, received, or otherwise exchanged as individual "data objects" comprising interrelated data. Data objects may constitute single bits of data or large quantities of interrelated data, such as substantive data (e.g., the underlying content to be conveyed through a communication) and associated metadata (e.g., data not otherwise considered to be substantive data, encompassing characteristics of the substantive data and/or the relevant exchange (e.g., the identity of the user sending the data, the identity of the user receiving the data, the time/date when the data was sent, formatting to be associated with the exchanged substantive data, the file type of the data object, and/or the like).

The memory 110 may additionally or alternatively store application programming interface(s) (API(s) 128), hypervisor(s), container orchestration system(s), an operating system, and/or container (unillustrated). The API(s) 128 may expose back-end functions and/or services hosted by the server(s) 102 to the user computing device(s) 104 and/or different component(s) hosted by the server(s) 102 without transferring the functions/services/software to those computing device(s) and/or by accomplishing the functions and/or services at the server(s) 102. As relates to the instant discussion, this may comprise API(s) for receiving indications from a user (e.g., as part of an API call), or from different ones of the components.

In some examples, software executed at the user computing device(s) 104, such as a client application 130, may generate API call(s) to the API(s) 128 and/or any of the component(s) discussed herein may transmit call(s) to the API(s) 128 and/or receive responses from the API(s) 128. For example, a user interface 132 executed by a client application 130 may display actuatable/selectable options to request that the client application 130 perform an action. In some examples, the client application 130 may interface with the API(s) 128 to authenticate a user and grant or deny the user access to a portion of the datastore 118 and/or data streaming component 116.

The memory 110 may additionally or alternatively include an operating system and/or container. In some examples, one or more containers may be instantiated by a cloud orchestrator and may run the operating system and may execute one or more instances of the API(s) 128 and the data streaming component 116 and may permit access to a portion of the datastore 118 according to permissions associated with a user and an organization associated with the container.

In some examples, the server(s) 102 may further comprise communication interface(s) 134, which can include one or more interfaces and hardware components for enabling communication with various other devices (e.g., the user computing device(s) 104), such as over the network(s) 106 or directly. In some examples, the communication interface(s) 134 can facilitate communication via WebSockets, APIs (e.g., using API calls), Hypertext Transfer Protocols (HTTPs), etc. The server(s) 102 can further be equipped with various input/output devices 136 (e.g., I/O devices). Such input/output devices 136 can include a display, various user interface controls (e.g., buttons, joystick, keyboard, mouse, touch screen, etc.), audio speakers, connection ports, and so forth.

In at least one example, the user computing device(s) 104 can include processor(s) 112, memory 114, communication interface(s) 138, and/or input/output device(s) 126. The memory 110 may store and execute a client application 130 and/or an operating system 124. In some examples, the client application 130 may be configured to authenticate a user to access data and/or services hosted by the server(s) 102. The API(s) 128 may filter the users and/or orgs accessible depending on permissions granted to a type of user profile and/or an organization associated with the user. In at least one example, a user profile to which a user authenticates can include permission data associated with permissions of individual users of the platform. In some examples, permissions can be set automatically or by an administrator of the platform, an employer, enterprise, organization, or other entity that utilizes the platform, a team leader, a group leader, or other entity that utilizes the platform for communicating with team members, group members, or the like, an individual user, or the like. Permissions associated with an individual user can be mapped to, or otherwise associated with, an account or profile. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the platform by maintaining security for limiting access to a defined group of users. In some examples, such users can be defined by common access credentials, group identifiers, or the like, as described above.

In some examples, the client application 130 may additionally or alternatively comprise instructions executable by one or more processors to provide a user interface 132. For example, the user interface 132 may comprise a graphical user interface (GUI), that the instructions may cause to be displayed via at least one of the input/output device(s) 126. In at least one example, the client application 130 can be a mobile application, a web application, a database interface (e.g., such as an application that presents a SQL or other database interface), or a desktop application. For example, a computing device of the one or more user computing device(s) 104 may access the API(s) 128 via a web browser or stand-alone application (either of which may be part of or host the client application 130) that communicates via network(s) 106 with API(s) 128.

In at least one example, the operating system 124 can manage the processor(s) 112, memory 114, hardware, software, etc. of the server(s) 102.

Figure 2:
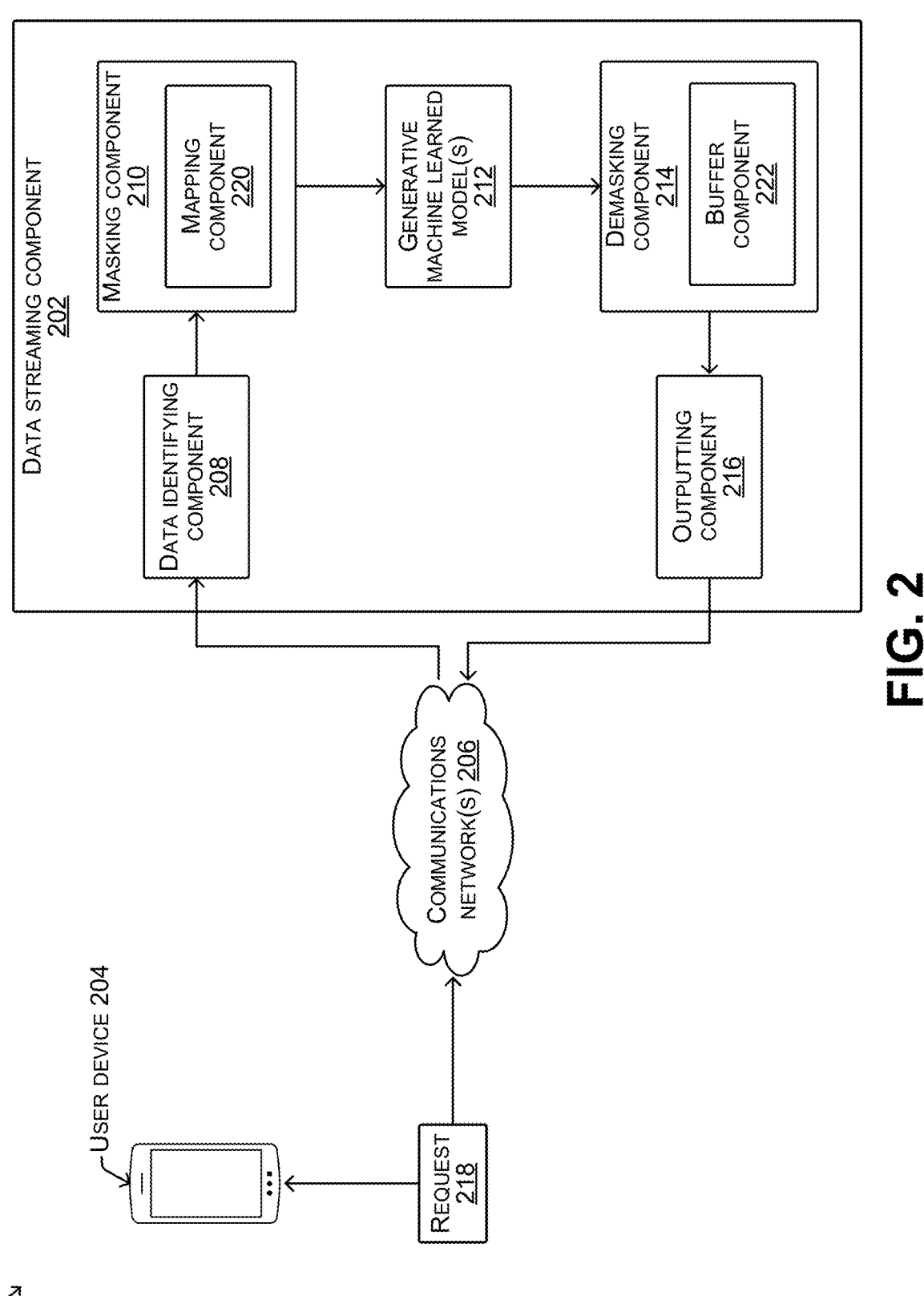
FIG. 2 depicts a block diagram illustrating the interactions of components of a data streaming component configured to apply transformations on streaming output.

FIG. 2 depicts a block diagram 200 illustrating the interactions of components of a data streaming component 202 configured to apply transformations on streaming output.

In some examples, the example block diagram 200 may be implemented with and/or in conjunction with a communication platform, search engine, sales-based platform, chatbot engine, and/or any other type of platform or system. In this example, the example block diagram 200 may include one or more user devices 204 configured to communicate with a communication platform via a communication network 206. Additionally, the example block diagram 200 may include a data streaming component 202 configured to stream LLM output to the user device 204. In some examples, the data streaming component 202 may include a data identifying component 208 configured to identify sensitive data to mask, a masking component 210 configured to mask the sensitive data, a generative machine learned model(s) component 212 configured to perform various operations using one or more LLMs, a demasking component 214 configured to demask data from the generative machine learned model(s) component 212, and/or an outputting component 216 configured to cause the streamed output to be output via the user device 204.

In some examples, the example block diagram 200 may include one or more user devices 204 configured to communicate with a data streaming component 202. The example block diagram 200 includes a user device 204. In this example, the user device 204 may be a mobile phone; however, in other examples, the user device 204 may be any other type of mobile device (e.g., wearable, tablet, etc.), stationary device (e.g., laptop, desktop, etc.), and/or any other type of device. In this example, the user device 204 may communicate with the data streaming component 202 via the communication network(s) 106, as described in FIG. 1. In some examples, a user may use the user device 204 to send a request 218 to a system that includes the data streaming component 202. In such cases, the request 218 may include user data (e.g., user profile, username, user role, user organization/company, etc.) and/or the requested action for the system to perform. In this example, the request 218 may include instructions (e.g., a question, a command, data to rely on, etc.) for the system to perform a task that relies on an LLM. In such cases, the data streaming component 202 may generate input data to input to the LLM while also ensuring that sensitive data is masked such that the sensitive data is not input to the LLM.

In some examples, the data streaming component 202 may include a data identifying component 208 configured to identify sensitive data to mask. That is, the data identifying component 208 may receive input data to be input into the LLMs. The data identifying component 208 may analyze the input data and identify data that may be sensitive to the user and/or organization. In some cases, a user and/or organization may indicate which types of data are considered sensitive. That is, as an example, the user and/or organization may indicate that names are not sensitive but all financial data is sensitive. As such, in such instances, the data identifying component 208 may flag financial data as being sensitive while not flagging names as sensitive. Of course, in other examples, the system may include a list of one or more types of data that may be considered sensitive which may include name(s) (e.g., username(s), organization name(s), etc.), phone number(s), addresses, government issued document(s) and/or information (e.g., driver's license data, social security number, passport data, etc.), financial data (e.g., credit card data, debit card data, bank account data, etc.), and/or any other type of data.

In some examples, the data streaming component 202 may include a masking component 210 configured to mask the sensitive data. The masking component 210 may receive the input data and/or the references to the sensitive data associated therewith. The masking component 210 may mask (or anonymize) the sensitive data by replacing the sensitive data with a mask (or placeholder data). When masking the sensitive data, a mapping component 220 of the masking component 210 may generate a mapping that includes a key-value pair. The key may be the mask and the value may be the sensitive data. The mapping component 220 may store the mappings such that the demasking component may be able to demask the LLM output data.

In some examples, the data streaming component 202 may include a generative machine learned model(s) component 212 configured to perform various operations using one or more LLMs. As noted above, the generative machine learned model(s) component 212 may include one or more LLMs that may be used to perform various tasks and/or operations. Accordingly, the generative machine learned model(s) component 212 may receive the input data (e.g., masked and non-masked data) and input the input data into an LLM. The LLM may be trained to output a subset of an entire response. That is, the LLM may output portions of the response (e.g., token(s)) in a streaming manner. As shown, the generative machine learned model(s) component 212 may send the LLM output to the demasking component 214.

In some examples, the data streaming component 202 may include a demasking component 214 configured to demask data from the generative machine learned model(s) component 212. The demasking component 214 may receive the LLM output token(s) from the generative machine learned model(s) component 212. As shown, the demasking component 214 may include a buffer component 222 that may generate and/or maintain a buffer. The buffer size may be determined based on the longest key generated by the masking component 210. That is, the buffer component 222 may receive the mappings from the mapping component 220 and determine which key of the key-value pairs is the longest (e.g., has the largest amount of characters). Based on identifying the longest key, the buffer component 222 may generate a buffer of the same size as the longest key.

In some examples, the buffer component 222 may add the token(s) received from the LLM into the buffer. When the buffer is full, the buffer component 222 may determine whether the contents of the buffer matches any of the keys in the key-value pair mappings. That is, the buffer component 222 may determine if the content in the buffer is a mask. If the buffer component 222 determines that the content in the buffer does not match any of the keys, the buffer component 222 may output a token from the buffer to the user device 204. In contrast, if the buffer component 222 determines that the content in the buffer matches a key, the buffer component 222 may replace the content in the buffer with the mapped sensitive data and output the sensitive data to the user device 204. The demasking component 214 may perform such operations until the LLM has output an entire response worth of tokens.

In some examples, the data streaming component 202 may include an outputting component 216 configured to cause the streamed output to be output via the user device 204. That is, the outputting component 216 may receive the emitted token or the sensitive data from the demasking component 214. The outputting component 216 may output such data to the user device 204 via the network 206. In such cases, the outputting component 216 may cause the token or the sensitive data to be output audibly or displayed via a user interface of the user device 204.

Figure 3:
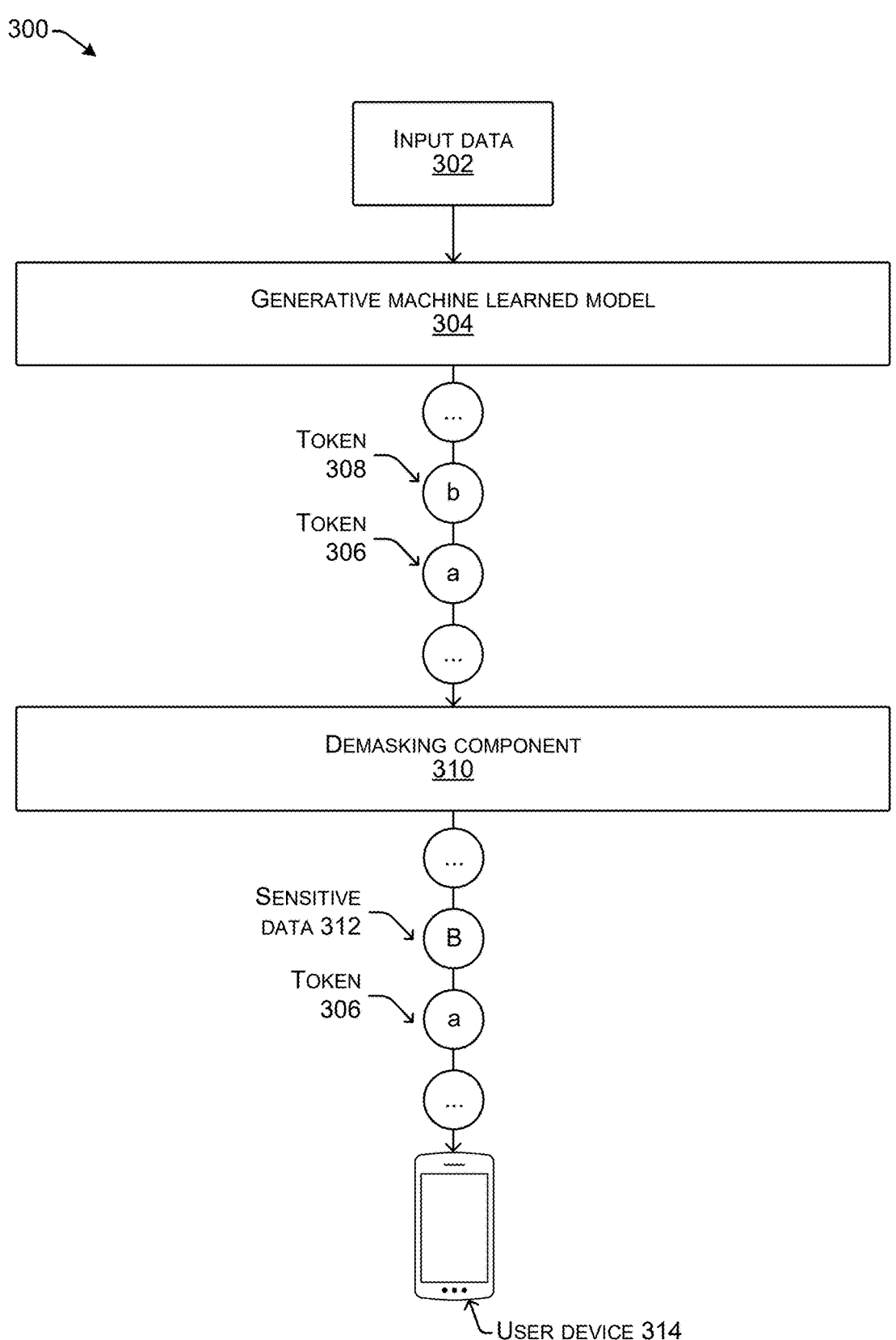
FIG. 3 illustrates a block diagram including an example generative machine learned model receiving tokenized input and outputting tokenized output to be streamed to a user device or virtual space.

FIG. 3 illustrates a block diagram 300 including an example generative machine learned model receiving tokenized input and outputting tokenized output to be streamed to a user device or virtual space.

In this example, the block diagram 300 may include input data 302. As described above, the input data 302 may be data (or information) to be input into an LLM. The system may generate the input data 302 from content within the request and/or from content in one or more of the databases associated with the system. Based on generating the input data 302, the system can identify and/or mask sensitive data included therein. Based on masking the sensitive data, the system can send the input data 302 into the generative machine learned model component 304 which may be similar or identical to the generative machine learned model component 212 of FIG. 2.

In some examples, the generative machine learned model component 304 may receive the input data 302 and output a response. As shown in FIG. 3, the generative machine learned model component 304 may output portions (less than the entire response) of the response in a streaming manner. That is, the generative machine learned model component 304 may output one or more token(s) at a time. For instance, the generative machine learned model component 304 may output (at different times) a token 306 which may represent one or more characters of the response, a token 308 which may represent one or more characters of the response, etc. The tokenized output may be sent from generative machine learned model component 304 to a demasking component 310.

In this example, the example block diagram 300 may include a demasking component 310 configured to demask the LLM output. The demasking component 310 may be similar or identical to the demasking component 214 in FIG. 2. In this example, the demasking component 310 may include a buffer. The demasking component 310 may add tokens to the buffer and upon determining that the buffer is full, the demasking component 310 may determine whether the contents of the buffer match a mask (or key). Accordingly, the demasking component 310 may receive the token 306 and add the token 306 to the buffer. Upon adding the token 306 to the buffer, the demasking component 310 may determine whether the content of the buffer matches a mask used to anonymize sensitive data. In this case, the demasking component 310 may determine that the content of the buffer does not match a key and as such, the demasking component 310 may emit a token from the buffer.

In some examples, the demasking component 310 may perform the above mentioned operations continuously while the LLM outputs tokens. As shown, the token 306 may continue to remain in the buffer until the demasking component replaces the token 306 with corresponding sensitive data or until the demasking component 310 emits the token 306. In this example, the demasking component 310 may emit the token 306 from the buffer based on the token 306 not being associated with sensitive data. As such, the token 306 may be output to a user device 314 of a user profile.

In addition to token 306, the LLM may output token 308 which may be sent to the demasking component 310. In this case, the demasking component 310 may add the token 308 to the buffer and determine whether the contents of the buffer match a key (or mask). In this case and as shown in FIG. 3, the contents of the buffer may match a key. As such, the demasking component 310 may replace the contents of the buffer with the sensitive data 312 and output the sensitive data 312 to the user device 314.

FIG. 4 is a pictorial flow diagram illustrating an example process 400 for masking sensitive data and/or applying transformations on streaming output.

At operation 402, the system can mask sensitive data. As described above, the system may receive a request to perform an operation. The system may rely on one or more LLMs to perform such operations and as such, the system may generate input data to input into the LLM. Accordingly, based on generating the input data, the system may determine whether the input data includes sensitive data. If the input data includes sensitive data, the system may generate a mask to anonymize such data. Further, the system may generate a mapping that defines a key-value pair of the mask and sensitive data. For example, the box 404 illustrates mappings of the sensitive data in the input data. In this example, the system determined that the input data included sensitive data that includes "Johnny" and "Johnny@gmail.com." As such, the system can mask the sensitive data. In this example and as shown in box 404, the mapping for "Johnny" (e.g., mapping #1) may include "<Person_0>" as the key (or mask) and "Johnny" as the value (or the sensitive data). Further, box 404 illustrates that the second mapping may include "<email_1>" as the key (or mask) and "Johnny@gmail.com" as the value. In some examples, the system can store the first and second mappings as shown in box 404 in a database associated with the system.

At operation 406, the system may input the masked input data into an LLM. That is, the system can input the input data that includes the masked and/or non-masked data into the LLM. As noted above, the LLM may be configured to output one or more tokens at a time in a streaming manner.

At operation 408, the system may determine a buffer size. That is, upon receiving the LLM output, the system may input the token(s) (or output) into a buffer. As such, the system may generate a buffer to contain such tokens. In this example, the buffer size may be determined based on the longest key. For example, box 410 illustrates the longest key and the size of the buffer. In this example, the longest key may be "<Person_0>" since "<Person_0>" has more characters (e.g., includes the largest amount of characters) than "<email_1>." As such, since "<Person 0>" has 10 characters, the system can generate a buffer that also has 10 characters.

At operation 412, the system may receive token(s) from the generative machine learned model (or LLM). As indicated above, the LLM may output a subset of a response. That is, the LLM may output one or more tokens at a time. The LLM may continue to output the token(s) until the entire LLM response has been output.

At operation 414, the system may add token(s) to the buffer. That is, based on receiving token(s) from the LLM, the system can add such token(s) to the buffer. Upon determining that the buffer is full (e.g., the system has input 10 tokens), the system can determine whether the contents of the buffer match one of the keys (e.g., "<email_1>" or "<Person_0>"). For example, box 416 illustrates contents of a buffer. In this example, the buffer may include contents that include "Hello <Perso." In this case, the most recently added token may be "o."

At operation 418, the system may emit token(s) from the buffer based on the buffer contents not matching a key. In some examples, the system may compare the contents of the buffer with the keys in box 404. In this example, the buffer contents may be "Hello <Perso" which does not match either "<email_1>" nor "<Person_0>." As such, the system may emit a token from the buffer and output the token to the user. As noted above, the buffer may be a first-in-first-out queue. Accordingly, the system may output the token that has been in the buffer the longest. In this example, the "H" may be the character that has been in the buffer the longest and as such, the system may emit the "H" from the buffer. As shown in box 420, after emitting the "H" from the buffer, the buffer contents may include "ello <Perso."

At operation 422, the system can continue adding and emitting token(s). That is, the system can continue to perform the operations described in operation 412, operation 414, and/or operation 418 until the entire LLM response has been output to the requesting user.

At operation 424, the system may determine that the buffer contents match a key. In some examples, while performing the operations described above, the buffer contents will eventually become "<Person_0>," as shown in box 426. Accordingly, the system may determine whether the contents of the buffer match any of the keys of the key-value pair mappings. As such, in this case, the contents of the buffer match the key of the first mapping described in box 404.

At operation 428, the system may replace the mask with the sensitive data and output the sensitive data. That is, based on the contents of the buffer matching a key from the mappings in box 404, the system may replace the buffer contents with the sensitive data. In this example, the system may replace "<Person_0>" with "Johnny." In such cases, the system can output the sensitive data (e.g., "Johnny") to the user.

FIG. 5 is a flow diagram illustrating an example process 500 for receiving a request for a generative machine learned model to perform an action, generating data to input to the generative machine learned model, and outputting a streamed response to a virtual space and/or user device. The processes illustrated in FIG. 5 is described with reference to components described above with reference to the example environment 100 shown in FIG. 1 for convenience and case of understanding. However, the processes illustrated in FIG. 5 is not limited to being performed using the components described above with reference to the example environment 100. Moreover, the components described above with reference to the example environment 100 are not limited to performing the processes illustrated in FIG. 5.

Process 500 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 502, the process 500 can include receiving a request for a generative machine learned model to perform an action. That is, a user profile may submit a request to the system for the system to perform an action. The user profile may submit the request by verbally commanding (e.g., speaking-audio data) the system to perform an action, interacting with a user device that uses the system (e.g., clicking or touching a user interface object within the system, typing and/or submitting text to a text entry box within the system, etc.), etc. In some examples, the request may include an instruction for the system (or LLM) to perform an action. The actions may include summarizing data, synthesizing data, generating documents, responding to question(s) and/or prompt(s), receiving data, etc.

At operation 504, the process 500 can include identifying, prior to inputting data associated with the request into the generative machine learned model, sensitive data. That is, the system may retrieve data to input into the LLM and use such data as the input data. The system may generate the input data by retrieving data from one or more sources. Such sources may include one or more databases within or otherwise associated with the system, information associated with the request (e.g., the question or command included in the request), etc. As such, the system may incorporate data from various sources when generating the input data.

In some examples, the system may identify sensitive data within the input data. That is, prior to inputting the input data into the LLM, the system can identify sensitive data included in the input data. Sensitive data may include name(s) (e.g., username(s), organization name(s), etc.), phone number(s), addresses, government issued document(s) and/or information (e.g., driver's license data, social security number, passport data, etc.), financial data (e.g., credit card data, debit card data, bank account data, etc.), and/or any other type of data. In some cases, information in the input data (which may be based on data in the request and/or the database associated with the system) may be sensitive data and as such, the users may not want the LLM using the sensitive data to train on and/or may want to keep such data secure. As such, the system may identify and/or anonymize the sensitive data in the input data. The system may identify sensitive data using one or more machine learned models, heuristics, and/or rules.

At operation 506, the process 500 can include generating, in response to identifying the sensitive data, modified data that includes a mask to anonymize the sensitive data. That is, the system can modify the input data (e.g., generate modified input data) that includes a mask to anonymize the sensitive data. A mask may be an obfuscation of data such that the LLM does not have access to (or information about) the sensitive data. Further, the mask may be a placeholder that is consistently used for a specific type of instance of the sensitive data. The mask may be any type of data such as "<person_0>," "email_1," etc. When masking the sensitive data, the system may maintain a mapping that includes a key-value pair. The key may be the masked data and the value may be the sensitive data. For example, the name "John" may be identified as sensitive data and the mask for such data may be "<Person_1>." As such, the key-value pair mapping may be "<Person_1>" as the key and "John" as the value. However, this is not intended to be limiting; in other examples, the sensitive data may be key and the mask may be the value. In some examples, the system may store or otherwise maintain the mappings such that the system can use the mappings to demask the sensitive data prior to outputting the LLM response to the user.

At operation 508, the process 500 can include inputting the modified data into the generative machine learned model that is configured to output a response. That is, after masking the sensitive data, the system may input the modified input data into the LLM. As noted above, the modified input data may include non-masked data (e.g., non-sensitive data) and/or masked data (e.g., corresponding to sensitive data). The system may include one or more generative machine learned models (e.g., LLMs) that may be trained to perform various system operations. In some cases, the system may train the LLMs to perform specific tasks. Accordingly, the system may input the input data into the LLM.

At operation 510, the process 500 can include receiving, from the generative machine learned model, a subset of the response. The LLM may be trained to output the response in a streaming manner. That is, the LLM may output one token (e.g., unit of data (e.g., letter, number, etc.)) or a group of tokens (e.g., two or more characters-less than the entire response) at a time. Based on receiving the token(s), the system may perform one or more operations on the token(s) and output (or stream) the output to the user profile. That is, the system can output tokens to the user profile prior to the entire LLM response being generated.

At operation 512, the process 500 can include causing the subset of the response to be added to a buffer. In some examples, prior to outputting the token(s) (or subset of the response) to the user profile, the system may determine whether to demask the token (e.g., whether the token corresponds to sensitive data). Upon receiving the token(s) from the LLM, the system may input the token(s) into a buffer (or queue). The buffer may be a first-in-first-out buffer. The size of the buffer may be based on (or correspond to) the longest key (or mask). That is, if the longest key is "<Person_1>", the system may determine that the size of the buffer is 10. In some examples, the system can add each token received from the LLM into the buffer.

At operation 514, the process 500 can include determining whether the buffer includes the mask. When the buffer is full (e.g., the system added N tokens where N is the size of the buffer), the system can determine if the content in the buffer matches (or is the same) as any of the keys in the mappings. If the content of the buffer does not match a key (514: No), the system can emit (or output) a token (e.g., the token that has been in the buffer the longest) to the user profile and/or add the newly received token from the LLM into the buffer. That is, at operation 516, the process 500 can include outputting a token from the buffer to the user device of the requesting user.

In contrast, if the content of the buffer matches a key (514: Yes), the system can replace the content in the buffer (e.g., the mask) with the sensitive data and output the sensitive data to the user profile. That is, at operation 518, the process 500 can include demasking the content of the buffer by replacing the mask with the sensitive data (e.g., the value in the key-value pair). At operation 520, the process 500 can include outputting the demasked content (e.g., the sensitive data) to the user device of the requesting user.

Example Clauses

A: A system comprising: one or more processors; and one or more non-transitory computer-readable media storing computer-executable instructions that, when executed, cause the one or more processors to perform operations comprising: receiving, from a user profile of a user, a request for a generative machine learned model to perform an action; identifying, prior to inputting data associated with the request into the generative machine learned model, sensitive data in the data; generating, in response to identifying the sensitive data, modified data that includes a mask to anonymize the sensitive data; inputting the modified data into the generative machine learned model that is configured to output a response; receiving, from the generative machine learned model, a subset of the response; causing the subset of the response to be added to a buffer; generating, in response to determining that the buffer includes the mask, a modified subset of the response that includes the sensitive data; and causing, in response to generating the modified subset of the response, the modified subset to be output to the user profile.

B: The system of paragraph A, wherein generating the modified subset of the response is based at least in part on: determining a buffer size associated with the buffer; and determining, based at least in part on the buffer size, that the buffer is full, wherein generating the modified subset is based at least in part on the buffer being full.

C: The system of paragraph B, wherein determining the buffer size is based at least in part on: receiving one or more mappings that include one or more keys with associated values; identifying, based at least in part on the one or more mappings, a size of a key of the one or more keys that includes a largest amount of characters; and generating the buffer size that corresponds to the size.

D: The system of paragraph A, wherein generating the modified subset of the response is based at least in part on: receiving one or more mappings that include one or more keys with associated values; comparing the one or more keys to contents associated with the buffer; determining, based at least in part on comparing the one or more keys to the contents of the buffer, that a key of the one or more keys match the contents in the buffer; and generating, based at least in part on the key matching the contents in the buffer, the modified subset of the response.

E: The system of paragraph A, the operations further comprising: receiving one or more mappings that include one or more keys with associated values; comparing the one or more keys to contents associated with the buffer; determining, based at least in part on comparing the one or more keys to the contents of the buffer, that the contents of the buffer are different than the one or more keys; and causing, in response to determining that the contents of the buffer are different than the one or more keys, a token of the buffer to be output to the user profile.

F: The system of paragraph A, wherein the sensitive data comprises at least one of: a user name, an organization name, a phone number, an address, government issued data, or financial data associated with the user.

G: One or more non-transitory computer-readable media storing instructions executable by one or more processors, wherein the instructions, when executed, cause the one or more processors to perform operations comprising: receiving, from a user profile of a user, a request for a generative machine learned model to perform an action; identifying, prior to inputting data associated with the request into the generative machine learned model, sensitive data in the data; generating, in response to identifying the sensitive data, modified data that includes a mask to anonymize the sensitive data; inputting the modified data into the generative machine learned model that is configured to output a response; receiving, from the generative machine learned model, a subset of the response; generating a modified subset of the response that includes the sensitive data; and causing, in response to generating the modified subset of the response, the modified subset to be output to the user profile.

H: The one or more non-transitory computer-readable media of paragraph G, wherein generating the modified subset is based at least in part on: causing the subset of the response to be added to a buffer; and determining that the buffer includes the mask, wherein generating the modified subset is based at least in part on determining that the buffer includes the mask.

I: The one or more non-transitory computer-readable media of paragraph H, wherein generating the modified subset of the response is based at least in part on: determining a buffer size associated with the buffer; and determining, based at least in part on the buffer size, that the buffer is full, wherein generating the modified subset is based at least in part on the buffer being full.

J: The one or more non-transitory computer-readable media of paragraph I, wherein determining the buffer size is based at least in part on: receiving one or more mappings that include one or more keys with associated values; identifying, based at least in part on the one or more mappings, a size of a key of the one or more keys that includes a largest amount of characters; and generating the buffer size that corresponds to the size.

K: The one or more non-transitory computer-readable media of paragraph H, wherein generating the modified subset of the response is based at least in part on: receiving one or more mappings that include one or more keys with associated values; comparing the one or more keys to contents associated with the buffer; determining, based at least in part on comparing the one or more keys to the contents of the buffer, that a key of the one or more keys match the contents in the buffer; and generating, based at least in part on the key matching the contents in the buffer, the modified subset of the response.

L: The one or more non-transitory computer-readable media of paragraph H, the operations further comprising: receiving one or more mappings that include one or more keys with associated values; comparing the one or more keys to contents associated with the buffer; determining, based at least in part on comparing the one or more keys to the contents of the buffer, that the contents of the buffer are different than the one or more keys; and causing, in response to determining that the contents of the buffer are different than the one or more keys, a token of the buffer to be output to the user profile.

M: The one or more non-transitory computer-readable media of paragraph G, wherein the sensitive data comprises at least one of: a user name, an organization name, a phone number, an address, government issued data, or financial data associated with the user.

N: A method comprising: receiving, from a user profile of a user, a request for a generative machine learned model to perform an action; identifying, prior to inputting data associated with the request into the generative machine learned model, sensitive data in the data; generating, in response to identifying the sensitive data, modified data that includes a mask to anonymize the sensitive data; inputting the modified data into the generative machine learned model that is configured to output a response; receiving, from the generative machine learned model, a subset of the response; generating a modified subset of the response that includes the sensitive data; and causing, in response to generating the modified subset of the response, the modified subset to be output to the user profile.

O: The method of paragraph N, wherein generating the modified subset is based at least in part on: causing the subset of the response to be added to a buffer; and determining that the buffer includes the mask, wherein generating the modified subset is based at least in part on determining that the buffer includes the mask.

P: The method of paragraph O, wherein generating the modified subset of the response is based at least in part on: determining a buffer size associated with the buffer; and determining, based at least in part on the buffer size, that the buffer is full, wherein generating the modified subset is based at least in part on the buffer being full.

Q: The method of paragraph P, wherein determining the buffer size is based at least in part on: receiving one or more mappings that include one or more keys with associated values; identifying, based at least in part on the one or more mappings, a size of a key of the one or more keys that includes a largest amount of characters; and generating the buffer size that corresponds to the size.

R: The method of paragraph O, wherein generating the modified subset of the response is based at least in part on: receiving one or more mappings that include one or more keys with associated values; comparing the one or more keys to contents associated with the buffer; determining, based at least in part on comparing the one or more keys to the contents of the buffer, that a key of the one or more keys match the contents in the buffer; and generating, based at least in part on the key matching the contents in the buffer, the modified subset of the response.

S: The method of paragraph O, further comprising: receiving one or more mappings that include one or more keys with associated values; comparing the one or more keys to contents associated with the buffer; determining, based at least in part on comparing the one or more keys to the contents of the buffer, that the contents of the buffer are different than the one or more keys; and causing, in response to determining that the contents of the buffer are different than the one or more keys, a token of the buffer to be output to the user profile.

T: The method of paragraph N, wherein the sensitive data comprises at least one of: a user name, an organization name, a phone number, an address, government issued data, or financial data associated with the user.

While the example clauses described above are described with respect to one particular implementation, it should be understood that, in the context of this document, the content of the example clauses can also be implemented via a method, device, system, a computer-readable medium, and/ or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing computer-executable instructions that, when executed, cause the one or more processors to perform operations comprising:
    receiving, from a user profile of a user, a request for a generative machine learned model to perform an action;
    identifying, prior to inputting data associated with the request into the generative machine learned model, sensitive data in the data;
    generating, in response to identifying the sensitive data, modified data that includes a mask to anonymize the sensitive data;
    inputting the modified data into the generative machine learned model that is configured to output a response;
    receiving, from the generative machine learned model, a subset of the response;
    causing the subset of the response to be added to a buffer;
    determining, based at least in part on determining that the buffer is full, that the buffer includes the mask;
    generating, in response to determining that the buffer includes the mask, a modified subset of the response that includes the sensitive data; and
    causing, in response to generating the modified subset of the response, the modified subset to be output to the user profile.

2. The system of claim 1, wherein generating the modified subset of the response is based at least in part on:
    determining a buffer size associated with the buffer; and
    determining, based at least in part on the buffer size, that the buffer is full, wherein generating the modified subset is based at least in part on the buffer being full.

3. The system of claim 2, wherein determining the buffer size is based at least in part on:
    receiving one or more mappings that include one or more keys with associated values;
    identifying, based at least in part on the one or more mappings, a size of a key of the one or more keys that includes a largest amount of characters; and
    generating the buffer size that corresponds to the size.

4. The system of claim 1, wherein generating the modified subset of the response is based at least in part on:
    receiving one or more mappings that include one or more keys with associated values;
    comparing the one or more keys to contents associated with the buffer;
    determining, based at least in part on comparing the one or more keys to the contents of the buffer, that a key of the one or more keys match the contents in the buffer; and
    generating, based at least in part on the key matching the contents in the buffer, the modified subset of the response.

5. The system of claim 1, the operations further comprising:
    receiving one or more mappings that include one or more keys with associated values;
    comparing the one or more keys to contents associated with the buffer;

21 determining, based at least in part on comparing the one or more keys to the contents of the buffer, that the contents of the buffer are different than the one or more keys; and causing, in response to determining that the contents of the buffer are different than the one or more keys, a token of the buffer to be output to the user profile.

6. The system of claim 1, wherein the sensitive data comprises at least one of:

a user name, an organization name, a phone number, an address, government issued data, or financial data associated with the user.

7. One or more non transitory computer readable media storing instructions executable by one or more processors, wherein the instructions, when executed, cause the one or more processors to perform operations comprising:

receiving, from a user profile of a user, a request for a generative machine learned model to perform an action;

identifying, prior to inputting data associated with the request into the generative machine learned model, sensitive data in the data;

generating, in response to identifying the sensitive data, modified data that includes a mask to anonymize the sensitive data;

inputting the modified data into the generative machine learned model that is configured to output a response;

receiving, from the generative machine learned model, a subset of the response;

determining, based at least in part on the subset of the response and determining that a buffer is full, that the buffer includes the mask;

generating, in response to determining that the buffer includes the mask, a modified subset of the response that includes the sensitive data; and causing, in response to generating the modified subset of the response, the modified subset to be output to the user profile.

8. The one or more non transitory computer readable media of claim 7, wherein generating the modified subset is based at least in part on:

causing the subset of the response to be added to the buffer; and determining that the buffer includes the mask, wherein generating the modified subset is based at least in part on determining that the buffer includes the mask.

9. The one or more non transitory computer readable media of claim 8, wherein generating the modified subset of the response is based at least in part on:

determining a buffer size associated with the buffer; and determining, based at least in part on the buffer size, that the buffer is full, wherein generating the modified subset is based at least in part on the buffer being full.

10. The one or more non transitory computer readable media of claim 9, wherein determining the buffer size is based at least in part on:

receiving one or more mappings that include one or more keys with associated values;

identifying, based at least in part on the one or more mappings, a size of a key of the one or more keys that includes a largest amount of characters; and generating the buffer size that corresponds to the size.

11. The one or more non transitory computer readable media of claim 8, wherein generating the modified subset of the response is based at least in part on:

receiving one or more mappings that include one or more keys with associated values;

comparing the one or more keys to contents associated with the buffer;

determining, based at least in part on comparing the one or more keys to the contents of the buffer, that a key of the one or more keys match the contents in the buffer; and generating, based at least in part on the key matching the contents in the buffer, the modified subset of the response.

12. The one or more non transitory computer readable media of claim 8, the operations further comprising:

receiving one or more mappings that include one or more keys with associated values;

comparing the one or more keys to contents associated with the buffer;

determining, based at least in part on comparing the one or more keys to the contents of the buffer, that the contents of the buffer are different than the one or more keys; and causing, in response to determining that the contents of the buffer are different than the one or more keys, a token of the buffer to be output to the user profile.

13. The one or more non transitory computer readable media of claim 7, wherein the sensitive data comprises at least one of:

a user name, an organization name, a phone number, an address, government issued data, or financial data associated with the user.

14. A method comprising:

receiving, from a user profile of a user, a request for a generative machine learned model to perform an action;

identifying, prior to inputting data associated with the request into the generative machine learned model, sensitive data in the data;

generating, in response to identifying the sensitive data, modified data that includes a mask to anonymize the sensitive data;

inputting the modified data into the generative machine learned model that is configured to output a response;

receiving, from the generative machine learned model, a subset of the response;

determining, based at least in part on the subset of the response and determining that a buffer is full, that the buffer includes the mask;

generating, in response to determining that the buffer includes the mask, a modified subset of the response that includes the sensitive data; and causing, in response to generating the modified subset of the response, the modified subset to be output to the user profile.

15. The method of claim 14, wherein generating the modified subset is based at least in part on:

causing the subset of the response to be added to the buffer; and determining that the buffer includes the mask, wherein generating the modified subset is based at least in part on determining that the buffer includes the mask.

16. The method of claim 15, wherein generating the modified subset of the response is based at least in part on:

determining a buffer size associated with the buffer; and determining, based at least in part on the buffer size, that the buffer is full, wherein generating the modified subset is based at least in part on the buffer being full.

17. The method of claim 16, wherein determining the buffer size is based at least in part on:

receiving one or more mappings that include one or more keys with associated values;

identifying, based at least in part on the one or more mappings, a size of a key of the one or more keys that includes a largest amount of characters; and generating the buffer size that corresponds to the size.

18. The method of claim 15, wherein generating the modified subset of the response is based at least in part on:

receiving one or more mappings that include one or more keys with associated values;

comparing the one or more keys to contents associated with the buffer;

determining, based at least in part on comparing the one or more keys to the contents of the buffer, that a key of the one or more keys match the contents in the buffer; and generating, based at least in part on the key matching the contents in the buffer, the modified subset of the response.

19. The method of claim 15, further comprising:

receiving one or more mappings that include one or more keys with associated values;

comparing the one or more keys to contents associated with the buffer;

determining, based at least in part on comparing the one or more keys to the contents of the buffer, that the contents of the buffer are different than the one or more keys; and causing, in response to determining that the contents of the buffer are different than the one or more keys, a token of the buffer to be output to the user profile.

20. The method of claim 14, wherein the sensitive data comprises at least one of:

a user name, an organization name, a phone number, an address, government issued data, or financial data associated with the user.

\*  \*  \*  \*  \*